(12) United States Patent
Randall

(10) Patent No.: US 8,430,612 B1
(45) Date of Patent: Apr. 30, 2013

(54) VEHICLE TIE-DOWN SYSTEM

(76) Inventor: Kyle Reese Randall, Payson, AZ (US)

(*) Notice: Subject to any disclaimer, the term of this patent is extended or adjusted under 35 U.S.C. 154(b) by 0 days.

(21) Appl. No.: 13/282,174

(22) Filed: Oct. 26, 2011

(51) Int. Cl.
*B60P 3/06* (2006.01)

(52) U.S. Cl.
USPC ............................................................ 410/3

(58) Field of Classification Search .................. 410/3, 7, 410/9, 10, 11, 19, 20, 21, 23, 30, 36, 42, 410/47, 49, 50, 77, 96, 97, 104
See application file for complete search history.

(56) References Cited

U.S. PATENT DOCUMENTS

| | | | |
|---|---|---|---|
| 1,776,935 A * | 9/1930 | Snyder | 410/30 |
| 3,912,139 A | 10/1975 | Bowman | |
| 4,057,182 A | 11/1977 | Kolkhorst et al. | |
| 4,227,633 A | 10/1980 | Sellberg | |
| 4,580,935 A | 4/1986 | Treihaft | |
| 4,659,266 A * | 4/1987 | Thelen et al. | 410/10 |
| 4,711,325 A | 12/1987 | Mountz | |
| 4,786,223 A * | 11/1988 | Crissy et al. | 410/20 |
| 4,932,829 A | 6/1990 | Miller | |
| 4,979,856 A * | 12/1990 | Blunden et al. | 410/9 |
| 5,011,347 A * | 4/1991 | Bullock | 410/9 |
| 5,106,245 A | 4/1992 | Fritz et al. | |
| 5,160,223 A * | 11/1992 | Seitz | 410/9 |
| 5,316,421 A * | 5/1994 | Bullock et al. | 410/9 |
| 5,593,260 A | 1/1997 | Zimmerman | |
| 6,099,219 A | 8/2000 | Bartholomay | |
| 6,530,729 B2 * | 3/2003 | Tatina | 410/7 |
| 6,651,996 B1 | 11/2003 | Allemang | |
| 6,725,979 B1 | 4/2004 | Snook | |
| 6,755,599 B1 | 6/2004 | Plyler | |
| 6,920,771 B1 | 7/2005 | Griffith | |
| 7,051,909 B2 | 5/2006 | Gibson | |
| 7,150,359 B1 | 12/2006 | Lyons et al. | |
| 7,316,530 B2 | 1/2008 | Saldana | |
| 7,513,725 B1 * | 4/2009 | Bullock | 410/10 |
| 7,632,052 B2 * | 12/2009 | Tatina | 410/20 |
| 7,641,086 B2 | 1/2010 | Green | |
| 2005/0135895 A1 * | 6/2005 | Valentine | 410/50 |
| 2006/0196906 A1 | 9/2006 | Gibson, Jr. | |
| 2009/0245962 A1 * | 10/2009 | Anderson et al. | 410/21 |
| 2011/0038681 A1 * | 2/2011 | Cencer | 410/10 |

* cited by examiner

*Primary Examiner* — H Gutman
(74) *Attorney, Agent, or Firm* — Cahill Glazer PLC

(57) ABSTRACT

A vehicle tie-down system for securing an ATV or similar vehicle to the bed of a truck or trailer includes a pair of spaced apart rails secured to the truck bed. First and second chocks are detachably secured between the rails and are positioned to provide a cradle for receiving the ATV wheel or tire. A flexible strap having a metal hook at one end is attached to a first chock and extended about the periphery of the tire and threaded through a rotatable cross-member in a second chock. The flexible web is wound upon the rotatable cross-member and locked in a tensioned position with a ratchet and pawl locking mechanism.

7 Claims, 3 Drawing Sheets

VEHICLE TIE-DOWN SYSTEM

FIELD OF THE INVENTION

The present invention pertains to vehicle tie-down systems and more specifically to such systems for securing a vehicle such as a motorcycle or ATV to the bed of a pickup truck or trailer.

BACKGROUND OF THE INVENTION

Transporting a vehicle such as an All-Terrain Vehicle (ATV) in the back of a pickup truck or on the bed of a trailer is a common technique for transporting a vehicle to a recreational area for use. Such vehicles have suspension systems that incorporate springs or similar structures that compress to absorb the shock of obstructions encountered in the road or ground being used by the ATV. The suspension systems permit the wheels to retract toward the vehicle body to minimize the impact of obstacles striking wheels or tires. When such vehicles are loaded onto the bed of a truck or trailer, they must be secured in place to prevent their movement during transport. Typically, straps or cables are attached or releasably secured to the chassis of the vehicle to maintain its position during transport on the bed of the truck or trailer.

As the truck or trailer moves over the ground, particularly if it is off-road, the violent shaking and bouncing imparted to the chassis of the vehicle on the bed results in the continuous compression and decompression of the springing system of the vehicle. As the springs are compressed, the cables or straps secured to the chassis are relaxed—that is, they lose the tension that was intentionally imposed to secure the chassis in place on the bed. As the strap tension is released, the forces securing the vehicle to the bed are relieved permitting the vehicle to move with respect to the bed surface and frequently resulting in the loss of sufficient tie-down force to maintain the vehicle in place. When the road over which the truck or trailer is passing is extremely rough, or if the truck is driving off-road, it is possible for the vehicle being transported to be damaged as a result of the violence of the repeated release of tie-down tension followed by the violent application of that tension as the suspension system/springs of the ATV rebound.

SUMMARY OF THE INVENTION

The present invention avoids the above difficulties relating to the transport of an All-Terrain Vehicle by securing the ATV's wheel/tire to the transporting vehicle's bed. The suspension system of the ATV therefore does not impose tension or stress to the tie-down system and the chassis of the ATV is free to respond to the violent motion of being transported without affecting the security of the tie-down position. Further, the present system provides a means for conveniently adjusting the accommodation for varying tire/wheel sizes of vehicles to be transported. The system is releasably secured to the bed of a truck or trailer and permits the ATV to be rolled into the system to provide a cradle position encasing the tire or wheel of the ATV and the locking of that position for transport.

BRIEF DESCRIPTION OF THE DRAWINGS

The present invention may more readily be described by reference to the accompanying drawings in which.

DETAILED DESCRIPTION OF THE INVENTION

Figure 1:
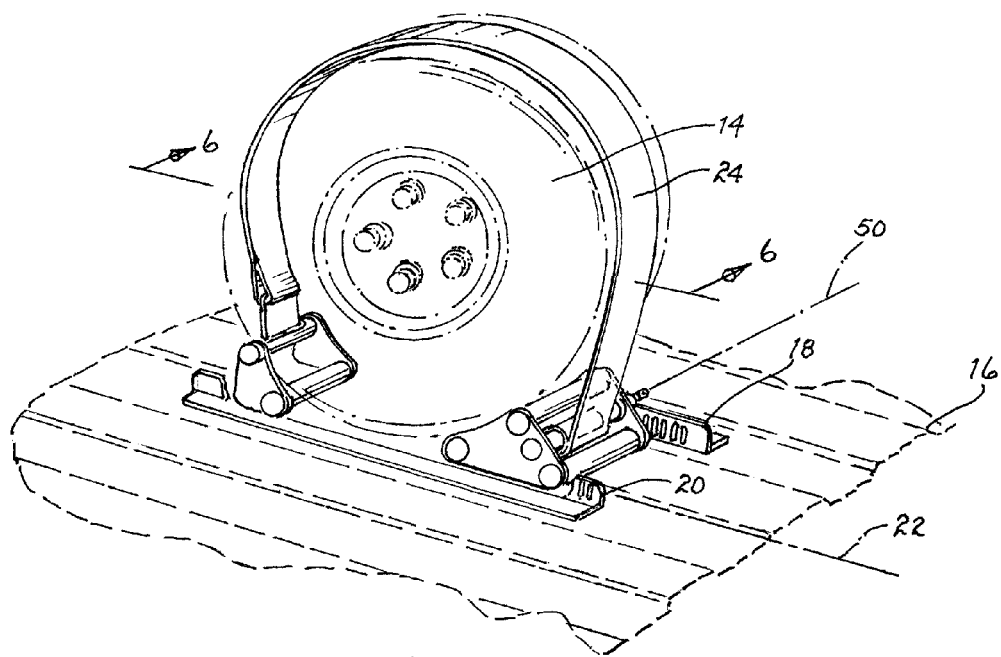
FIG. 1 is a perspective view of a tie-down system constructed in accordance with the teachings of the present invention illustrating its application on the bed of a truck securing a wheel/tire to the truck bed.

Referring to the Figures, a tie-down system constructed in accordance with the present invention is shown. The system includes first and second chocks 10 and 12, respectively, spaced apart to accept a vehicle wheel 14 therebetween. The chocks "cradle" the vehicle wheel while the chocks are secured to the truck or trailer bed 16 through the utilization of rails 18, 20. The rails are secured to the truck or trailer bed and are aligned parallel to a longitudinal maintaining axis 22 that is generally aligned with the longitudinal axis of the truck or trailer (not shown). Thus, the rails are parallel to permit the chocks to be secured between the rails. A flexible strap 24 or web is secured to the first chock and circumscribes the tire or wheel of the transported vehicle to a rotatable cross-member 26 of the second chock 12. The web is tightened securely and locked in the tensioned or tightened position to secure the wheel or tire to the chocks and thus to the truck or trailer bed.

Figure 2:
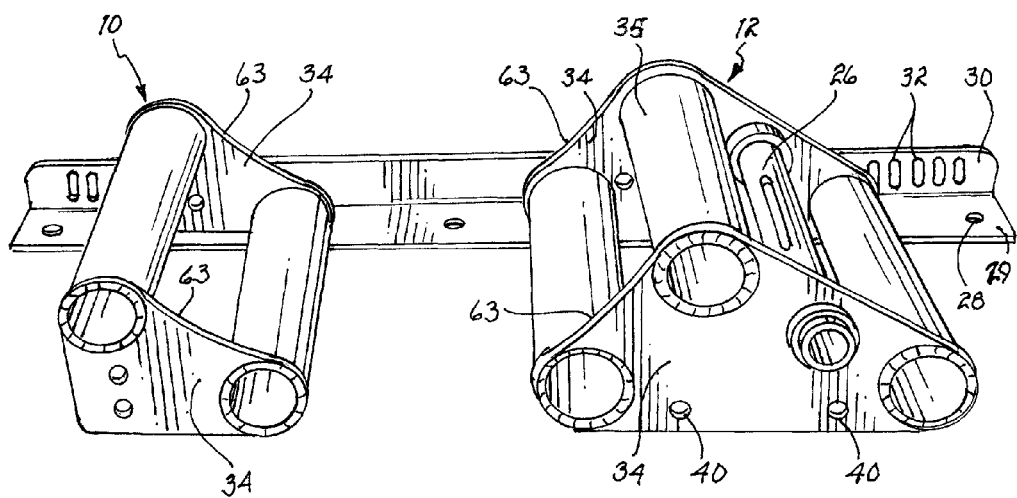
FIG. 2 is a perspective view, partly in section, of the system of FIG. 1.

Referring to FIG. 2, the rails each include a plurality of holes 28 for accepting bolts to secure the respective rail to the bed of the truck or trailer. The rails have an L-shaped cross-section with the horizontal wall 29 provided with holes 28 to accept bolts for attachment to the truck bed. The vertical wall 30 of the respective rail incorporates a plurality of vertically oriented slots 32.

The chocks each incorporate side plates 34 with cross-members 35 extending between the respective side plates and secured thereto to form a rigid structure. In the chosen embodiment, the cross-members are cylindrical tubular members that may be welded or otherwise secured to the side plates. It has been found that in most applications for use with ATV's, the cross-members can be formed of aluminum tubes with a nominal diameter of 3" while the side plates may be formed of ¼" aluminum plate. The resulting structure is extremely strong, very compact, and readily installed/removed.

The chocks are secured between the rails by bolts 38 that extend through selected vertical oriented slots 32 in the opposing parallel rails through openings in the side plates to accept those bolts. Thus, the positioning of the first and second chocks may be adjusted along the longitudinal axis to accommodate the position of an ATV on the bed of the truck or trailer and position the ATV in its most convenient location. For example, the first chock is noticeably shorter than the second chock; in this manner, the first chock may be located closer to the cab of a truck to accommodate large or lengthy ATV's or similar transported vehicles. The distance between the respective chocks may thus easily be adjusted to accommodate any vehicle wheel or tire size to permit the chocks to "cradle" the tire. It is important for the chocks to be in contact with the wheel to help maintain the wheel's position during acceleration or braking forces of the towing vehicle. It may be noted that the side plates 34 of both the first chock 10 and the second chock 12 are provided with a slight curvature on that portion of the side plates facing the vehicle wheel. This slight curvature may best be seen in FIG. 2 and identified by the reference numeral 63. This slight curvature is imparted to the respective side plates to accommodate the curvature of the wheel as it is cradled between the chocks. While the main contact surface between the chocks and the wheel or tire will occur at the cross-members 35, any portion of the wheel or tire that may extend beyond the side plates will therefore not be impeded or presented with an interfering side wall surface. The slight curvature accomplishes the accommodation of the wheel curvature without sacrificing the strength of the respective chocks. Thus, the tie-down system of the present invention is easily adjustable to accommodate a variety of ATV or transported vehicle wheel sizes.

It should be noted that the vertical walls 30 of the rails incorporate vertically oriented slots 32. These slots accept the bolts extending through the sidewalls of the corresponding chocks but nevertheless permit slight variations in the vertical positioning of the bolt as a result of slight variations in the surface of the truck or trailer bed. Therefore, even though the truck bed may not be perfectly flat, the utilization of the vertically oriented slots permits the sidewalls of the chocks to be secured to the rails even if the supporting truck bed is uneven.

The bolts utilized to secure the chocks to the rails may be single large bolts extending from one rail, through the sidewalls of the corresponding chock, to the opposing rail; alternatively, separate bolts may be used for each of the rails.

Figure 4:
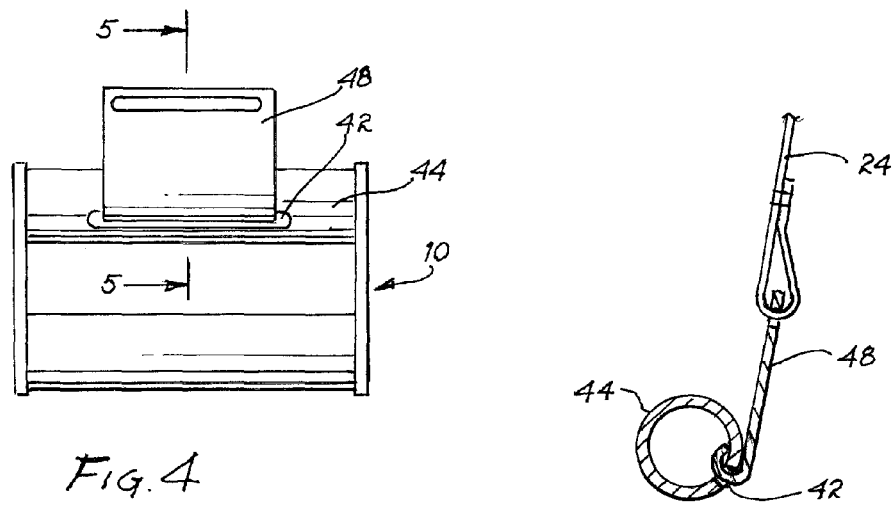
FIG. 4 is an end view of a portion of the tie-down system of FIG. 1 showing the connection between a flat hook of a web and the slot provided therefor in a cross-member.
Figure 5:
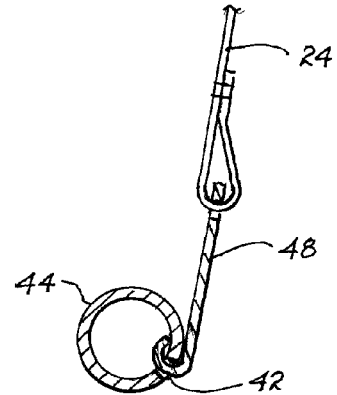
FIG. 5 is a cross-sectional view of a portion of FIG. 4 taken along line 5-5 with the addition of a web to illustrate the inner connection between the web and a cross-member.

The first chock 10 includes a slot 42 provided in a cross-member 44 thereof, this slot extends through the wall of the cylindrical tube and is sized to accept a flattened metal hook 48 of the tie-down web (to be described hereinafter). The slot and mating flat metal hook of the web may best be seen by reference to FIGS. 4 and 5 wherein the cylindrical tubular cross-member 44 of the first chock is shown in cross-section and incorporates a slot that accepts the flat hook 48 of the flexible web 24. In this manner, one end of the tie-down web is firmly and securely attached to the first chock.

Figure 7:
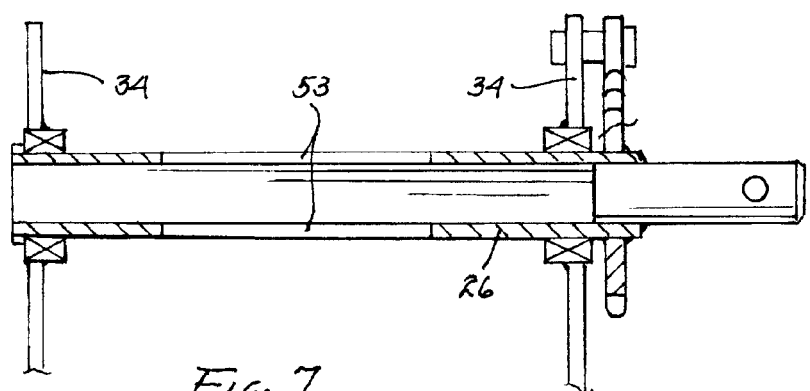
FIG. 7 is a cross-sectional view of a portion of FIG. 6 taken along line 7-7.
Figure 8:
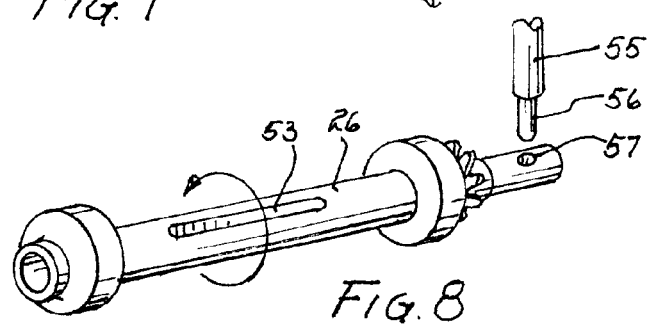
FIG. 8 is a perspective view of the rotatable cross-member of a chock.

The second chock 12 includes a rotatable cross-member 26 extending between the side plates 34 thereof and is journaled in the side plates to permit rotation of the rotatable member about its axis. The rotational axis 50 of this rotatable member is substantially perpendicular to the long mounting axis 22. The rotatable member has opposing slots 53 therein to threadedly accept an end of the flexible web 24. The rotatable cross-member of the second chock may best be seen by reference to FIGS. 7 and 8 wherein it may be seen that the rotatable cross-member 26 is journaled in the side plates 34 of the second chock; the rotatable cross-member may be rotatably mounted through the utilization of bearings or simply holes provided in the side plates that preferably are reinforced to accommodate the rotation of the cross-member and support the forces resulting from the tightening of the web. The web is thus rotatable about the rotatable cross-member to permit the winding of the web thereupon and for tensioning the web to secure the wheel in the cradle position between opposing chocks. The tension is applied through the utilization of a tensioning tool 55 that could be a simple rod or metal bar with a reduced diameter end 56 for insertion into a mating hole 57 provided in the end of the rotatable cross-member 26.

Figure 3:
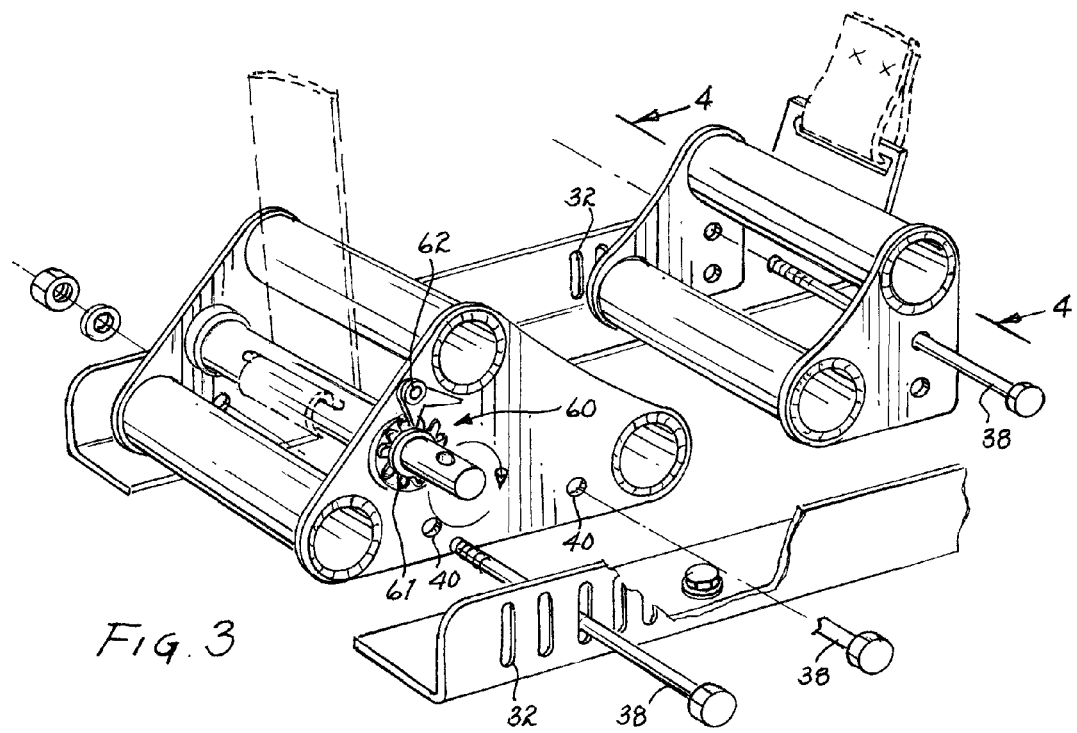
FIG. 3 is a perspective view, exploded and partly in section, of the tie-down system of FIG. 1.

As the web is tensioned by the force applied through the tool, and the rotatable cross-member is rotated to wind the web thereupon, the rotatable member is locked in position by a locking device that, in the embodiment chosen for illustration, is a ratchet and pawl mechanism 60. The ratchet and pawl may best be seen by reference to FIG. 3 wherein the ratchet 61 is shown secured to the rotatable cross-member 26 and engages a pawl 62 that allows rotation of the rotatable member in only one direction. Thus, as the web is tightened through the rotation of the rotatable member, the pawl engages the ratchet to maintain that tension. The tension may be released in a typical manner by slightly increasing the tension with the use of the tensioning tool and lifting the pawl out of engagement with the ratchet and thus releasing the web tension.

Figure 6:
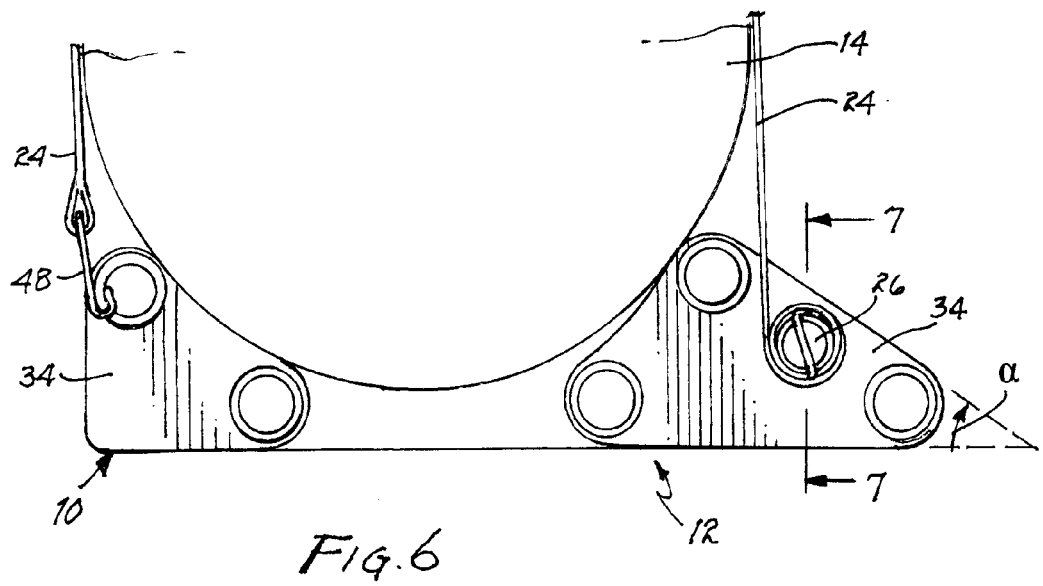
FIG. 6 is a partial side-elevational view, and partly in section, of a portion of the tie-down system of FIG. 1 useful for describing the interconnection between a web and the chocks of the present invention.

As described above, the first chock 10 is smaller than the second chock 12 to facilitate positioning of an ATV close to the cab of a transporting truck and to provide more convenient positioning of a transported vehicle when the space available on the bed may be limited. The second chock 12 incorporates at least three non-rotatable cross-members 35 as shown in the drawings and particularly in FIG. 6. The three cross-members extending between the corresponding side plates form a triangle with the longest side thereof parallel to the bed of the truck or trailer. The surface formed by the second longest surface of the triangle forms an angle $\alpha$ with the bed of the truck. This angle is chosen to provide a gentle slope to facilitate the mounting and positioning of the ATV to cradle the wheel thereof between the chocks. That is, the ATV may be pushed or driven gently up the surface formed at the angle $\alpha$ to "drop" into its cradled position between the chocks. In the preferred embodiment, the angle $\alpha$ is approximately 30'; it has been found that this angle should be less than 45° and preferably as small as possible to permit the easy positioning of the ATV wheel in the cradle formed by the chocks. It is therefore easier to push or drive the ATV into its secured tie-down position than if both chocks were formed in the same configuration as the first chock.

The flexible web may be formed of typical webbing material utilized for tie-downs or towing and is usually formed of a multi-ply fabric such as nylon, or similar synthetic polymer, that may be 3" to 5" in width and typically a ⅛" or less in thickness. The web is secured to the flat metal hook at one end thereof by folding the web through a slot provided therefor in the shank of the metal hook and riveted or sewn in position. The opposite end of the web is usually a squared end that is unfinished or is treated to prevent fraying of the threads comprising the web. As described above and as best seen in FIGS. 4 and 5, the metal hook at the end of the web is inserted in the slot in the cross-member of the first chock, and is wound about the periphery of the tire or wheel. The second end is threaded through the slot provided therefor in the rotatable cross-member of the second chock and wound thereon as described above.

The present invention has been described in terms of selected specific embodiments of the apparatus and method incorporating details to facilitate the understanding of the principles of construction and operation of the invention. Such reference herein to a specific embodiment and details thereof is not intended to limit the scope of the claims appended hereto. It will be apparent to those skilled in the art that modifications may be made in the embodiments chosen for illustration without departing from the spirit and scope of the invention.

What is claimed:

1. A vehicle tie-down system comprising:
   (a) first and second spaced apart rails parallel to each other for attachment to the bed of a truck or trailer and parallel to a longitudinal mounting axis;
   (b) each of said rails having an L-shaped cross-section with horizontal and vertical walls, said horizontal walls having a plurality of holes to accept bolts for securing to the bed;
   (c) said vertical walls having a plurality of vertically oriented slots for accepting bolts for attachment to first and second chocks;
   (d) said first and second chocks each comprising;
      i. opposing side plates having openings to accept bolts for attachment to said rails;
      ii. a plurality of cross members extending between said side plates and secured thereto to establish and maintain a predetermined distance between the side plates;
   (e) one of the cross-members in said first chock having a slot therein to accept a flat hook of a flexible web;
   (f) a rotatable cross-member mounted on the second chock extending between and journaled in the side plates thereof to permit rotation about a rotational axis perpendicular to said longitudinally mounting axis;
   (g) said rotational cross-member having a slot extending therethrough to receive said flexible web and permit said flexible web to be wrapped around the rotatable cross-member;
   (h) a rotational locking device, mounted on a side plate of the second chock, to inhibit, when activated, the rotation of said rotatable cross-member; and
   (i) said flexible web having said flat hook secured at one end thereof for insertion into the slot in a cross-member of said first chock and having another end thereof adapted for insertion into the slot of said rotational cross-member of said second chock to be wound thereon.

2. The vehicle tie-down system of claim 1 wherein said chocks are bolted to said rails and are spaced apart a distance to accept and cradle a wheel or tire of said vehicle.

3. The vehicle tie-down system of claim 2 wherein said web hook engages the slot in said one of the cross-members of said first chock, and said web extends about and contacts a periphery of the wheel or tire and extends through the slot in the rotatable cross-member of the second chock and is wrapped around said rotatable cross-member to thereby secure the vehicle wheel to the truck or trailer bed.

4. The vehicle tie-down system of claim 1 wherein said cross-members are tubular.

5. The vehicle tie-down system of claim 1 wherein said cross-members are cylindrical tubes welded to said side plates to form a rigid structure.

6. The vehicle tie-down system of claim 1 wherein said second chock includes three or more said cross-members forming, in side elevation, a triangle having one side thereof forming an angle with the bed less than 45° to provide a gently sloping plane to facilitate the rolling movement of a wheel or tire into a cradled position.

7. The vehicle tie-down system of claim 1 wherein said rotatable locking device comprises a ratchet mounted on said rotatable cross-member and a pawl secured to a side-plate of said second chock and positioned to engage the ratchet to thus permit the rotatable cross-member to rotate in only one direction.

\* \* \* \* \*